Sept. 11, 1962   B. G. BJORNSON   3,053,134
OPTICAL PULSE ECHO SYSTEM
Filed April 1, 1948   2 Sheets-Sheet 1

INVENTOR
B. G. BJORNSON
BY
G. H. Heipt
ATTORNEY

Sept. 11, 1962    B. G. BJORNSON    3,053,134
OPTICAL PULSE ECHO SYSTEM
Filed April 1, 1948    2 Sheets-Sheet 2
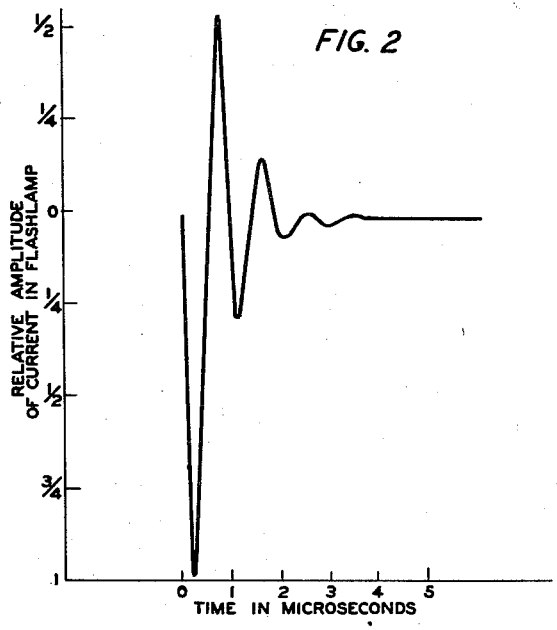
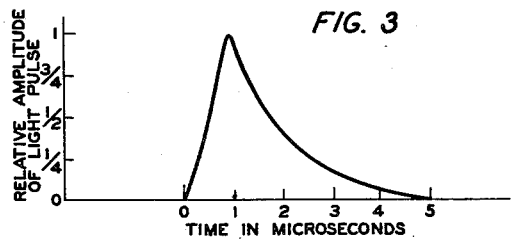
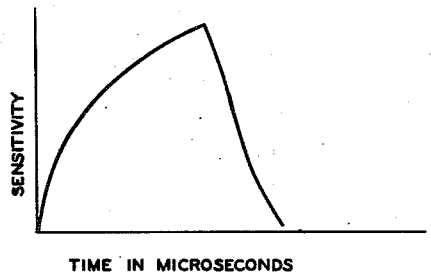
INVENTOR
B. G. BJORNSON
BY
ATTORNEY

United States Patent Office 3,053,134
Patented Sept. 11, 1962

3,053,134
OPTICAL PULSE ECHO SYSTEM
Bjorn G. Bjornson, New York, N.Y., assignor to Bell Telephone Laboratories, Incorporated, New York, N.Y., a corporation of New York
Filed Apr. 1, 1948, Ser. No. 18,307
7 Claims. (Cl. 88—1)

This invention relates to pulse echo receiving systems and methods, and in particular to means for controlling the sensitivity of a pulse echo receiver.

An object of the invention is to obtain an improved pulse echo transmitting and receiving system.

Another object is to obtain a means for varying the sensitivity of a pulse echo receiver.

A further object is to obtain an improved sensitivity time control circuit for supply voltages for controlling the sensitivity of a pulse echo receiver.

A still further object is to obtain means for synchronously conrolling the sweep of a pulse echo indicator in accordance with the transmission of pulses.

Other objects of this invention will be apparent to those skilled in the art from studying the following specification and considering it in connection with the attached drawings.

In pulse echo system, an energy pulse is transmitted towards a pulse reflecting object and a reflected pulse is received from the object. The range of an object in relationship to a transmitting-receiving system may be obtained by a knowledge of the travel speed of an energy pulse and by measuring, in units of time, the time consumed by the pulse in traveling from a transmitter to an object and in returning from the object to a receiver. The bearings of the object may be readily obtained by compass in respect to any reference point.

The equipment, in accordance with the particular embodiment of the invention described herein, obtains the range and bearing of an object or target, and utilizes pulses of infra-red radiation. The infra-red pulses may be supplied by a high-voltage gas-discharge flash lamp. When the flash lamp discharges, infra-red pulses are directed towards a target and echo pulses are received back from the target. In order to facilitate the return of these pulses they may be directed upon retrodirective trihedral reflectors which are placed upon objects which are to be located. These reflector targets may be used singly or may be arranged in clusters so as to afford greater coverage and increase the equipment range.

When the reflected echo pulses return from the target they impinge upon a parabolic reflector whch focusses them upon the cathode of an infra-red sensitive photo-electron multiplier. The echo pulses are converted into electrical pulses, similar to radar video signals, and after amplification are utilized to produce a visual indication of the relative positions of targets in range and azimuth upon the screen of a plan position indicator. The target images appear as individual bright spots upon the screen of the plan position indicator. A synchronizing pulse from the flash lamp may be utilized to start the sweep of the plan position indicator, and also to initiate the application of a control voltage from a sensitivity time control circuit network to elements within the photomultiplier tube. The rotation of the sweep of the plan position indicator may be synchronized with rotation of scanning equipment, and may be phased in relation to information obtained from a gyrocompass repeater.

The intensity of an infra-red echo pulse from a target of a given size will vary inversely as the square of the distance to the target. For example, the peak amplitude of an echo pulse received from a target situated at a distance of one hundred yards will be one hundred times greater than the peak amplitude of an echo pulse from the same target situated at a distance of one thousand yards. This difference in peak amplitudes amounts to approximately forty decibels. If the gain of an associated amplifier is increased in order to produce a bright spot indication on an indicator screen upon the receipt of an echo signal from a remotely situated target, the amplitude of an acho signal received from a target situated close to the receiving equipment would possibly be large enough to overload the amplifier. If the echo pulses from a target were square-wave pulses, the difference in amplitude between the signals received from both close and remotely situated targets could be equalized by designing the amplifier so as to limit the amplitudes of the echo pulses. However, the flash lamp pulses are not square-wave pulses but decay exponentially as will be explained. Limiting the amplitude of these echo pulses without using any other control would result in lengthening the echo pulses received from nearby targets so that these echo pulses would appear as bright radial lines, rather than as bright spots, upon an indicator screen.

In the particular embodiment of the invention as shown herein, the signal echo pulses from both near and remotely situated targets are equalized by applying a varying voltage from a sensitivity time control circuit network across the various photomultiplier stages, so that the echo pulses appear as signals of substantially equal intensity upon the screen of the position plan indicator.

While the invention will be described with particular reference to apparatus employing infra-red radiations, it is to be understood that in certain aspects the invention is not limited to infra-red radiation but is also applicable for use with ultra-violet and visible radiations.

Referring to the drawings:

FIG. 2 is a graph showing the shape of a current pulse through a flash lamp utilized in the system of FIG. 1;

FIG. 3 is a graph showing the light intensity of the flash lamp pulse of FIG. 2; and FIG. 4 is a graph showing the shape of a varying voltage applied to a photomultiplier used in the system of FIG. 1.

Figure 1:
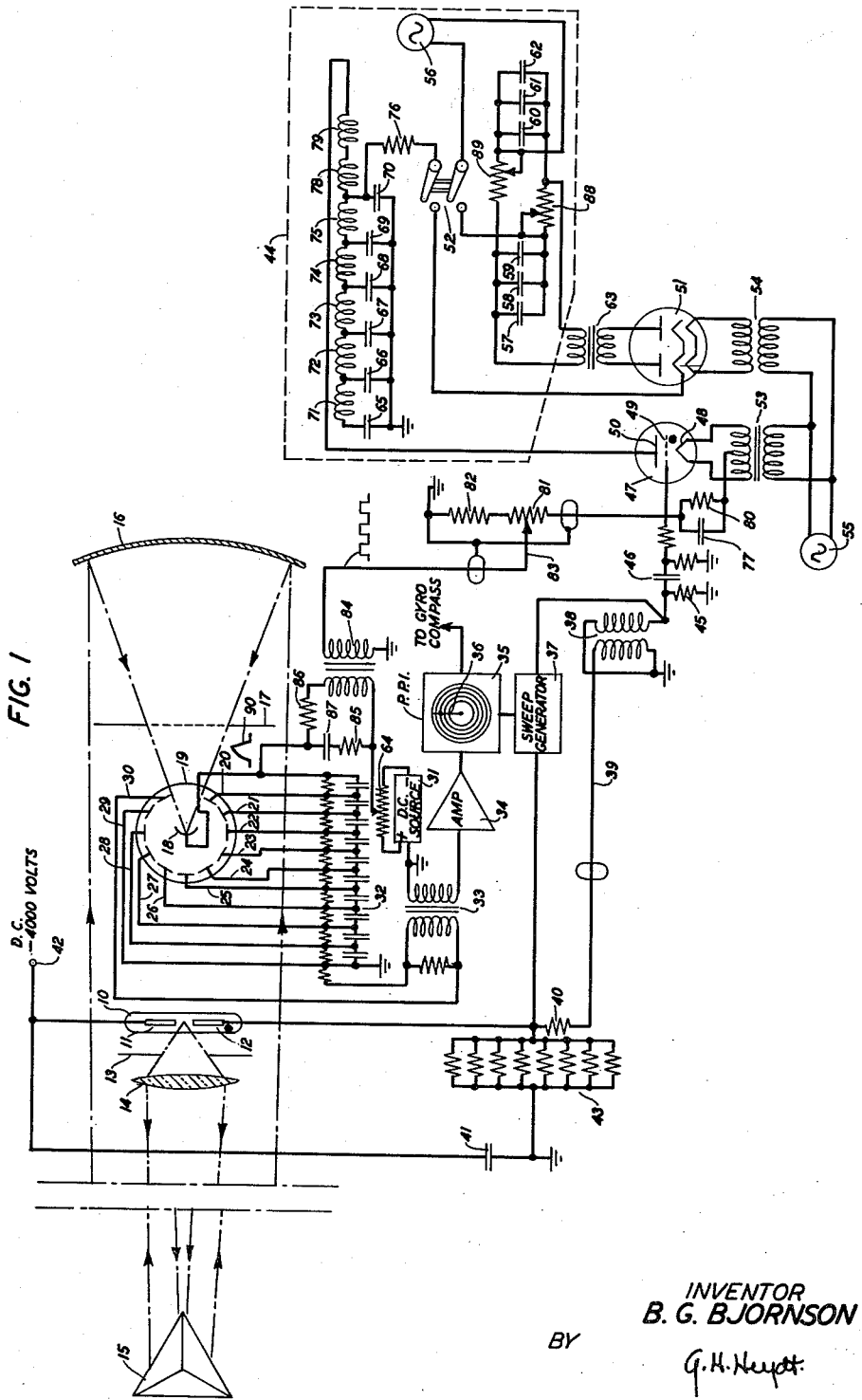
FIG. 1 is a schematic drawing of a pulse-echo transmission and reception system in accordance with a particular embodiment of the invention.

Referring to FIG. 1, flash lamp 10 consists of two electrodes 11 and 12 which are situated within a glass container. The container also contains a suitable flash gas such as a mixture of argon and hydrogen. Situated in front of the flash lamp 10 is a filter 13 and a lens 14. Light pulses initiated by a discharge flash occurring between the electrodes 11 and 12 of the flash lamp 10 may pass through the filter 13 and the lens 14. The filter 13 will substantially remove all the visible components of the flash pulses, while the lens 14 will focus the pulses so that they are projected into space as a narrow beam of infra-red radiation. When the projected pulse beam impinges upon the surface of a remotely situated retrodirective trihedral reflector target 15 it will be reflected back along a reflection path as illustrated. The reflection path is almost parallel to the line of pulse projection. The reflected beam impinges upon the surface of a parabolic reflector 16 which may be so situated as to be concentric with the projection lens 14. The parabolic reflector 16 focusses the reflected pulse beam through a filter 17 upon an infra-red sensitive cathode 18 of a photomultiplier tube 19. It will be readily understood that the units 10, 13, 14, 16, 17 and 19 may be positioned within any suitable scanning container in a manner well known to those skilled in the art. If extreme secrecy of operation is desired the target 15 may be covered by a suitable filter similar to the filters 13 and 17.

Situated within the photomultiplier tube 19 are the following elements, the cathode 18, and ten dynodes 20, 21, 22, 23, 24, 25, 26, 27, 28, 29; also a collector plate 30. The cathode dynodes and collector plate may be coated with caesium oxide or any other suitable material so as to make these elements sensitive to infra-red radiations. A high-voltage negative potential from an adjustably controllable direct-current source 31 is applied to the cathode 18 and to the ten dynodes 20 to 29. This direct-current voltage is equally divided among the ten dynode stages by a bleeder circuit network generally titled 32, and comprising ten resistors each of which is shunted by a condenser, as illustrated. This bleeder circuit network 32 maintains each dynode at a constant potential when a reflected echo signal pulse is traveling through the tube 19. The gain of each stage in the photomultiplier tube 19 depends upon the potential difference between one dynode and the succeeding dynode. A positive potential is applied to the collector plate 30 through a video output transformer 33, and the dynode 29 is maintained at ground potential.

When an echo pulse impinges upon the cathode 18 from the reflector 16 the cathode emits electrons. These emitted electrons are attracted to the dynode 20. When the electrons, from the cathode 18, strike the dynode 20, the dynode 20 emits a larger number of electrons than did the cathode 18. Electrons from the dynode 20 are attracted to the dynode 21 which emits more electrons than did the dynode 20. The electrons travel from one dynode to the next and increase in number at each travel stage, and the tube current increases by the same factor from one dynode to the succeeding dynode. The potential applied to the collector plate 30 does not introduce any gain in the system but serves to attract the electrons emitted by the dynode 29. The output of the tube 19 is led from the collector 30 through a high impedance winding of a video transformer 33. The signal current pulses passing through the transformer 33 produce a pulse signal output voltage, but the effect of steady illumination is eliminated by the transformer 33. The output of the transformer 33 is led to an amplifier 34 and thence to a plan position indicator 35. The sweep 36 of the plan indicator 35 is controlled by a sweep generator 37 which is actuated by a synchronizing positive pulse from a transformer 38, via a coaxial synchronizing cable 39 and a resistor 40, from the energizing circuit of the flash lamp 10 as will be explained. The resistor 40 is inserted in this circuit to assist in terminating the coaxial cable 39 in a characteristic impedance.

The flash lamp 10 is flashed by electromotive energy obtained from a condenser 41. The condenser 41 is charged from a high-voltage direct-current source 42. The source 42 may comprise a rectifier or any other suitable source of direct-current. When the potential between the terminals of the condenser 41 equals the breakdown value of the lamp 10, the flash gas in the lamp becomes ionized and a spurt of current flows from the condenser 41 through the lamp 10, and thence through eight parallel resistors 43. This current spurt will have the form of a damped oscillation wave.

The voltage developed across the eight resistors 43, due to the flow of current from the condenser 41, is utilized as a synchronizing voltage, as stated above, to actuate the range sweep 36 of the plan position indicator 35, and also is used to synchronize a voltage from a sensitivity time control circuit network titled 44 as will be explained.

Referring to FIG. 2, the graph shows a flash current pulse from the flash lamp in the form of a damped oscillation wave. The first peak of this wave may be of the order of from fifteen hundred to two thousand amperes.

Referring to FIG. 3, the graph shows the light intensity of a flash pulse from the flash lamp. It will be observed that this flash pulse envelope exhibits a steep rise, a sharp peak, and an approximately exponential decay with time. The duration of the flash is about one microsecond long, as measured between half-amplitude points on the build-up and decay portions of the curve. By comparing the graph of FIG. 2 with the graph of FIG. 3 it will be observed that the light pulse decays at a slower rate than the rate at which the current decreases in the flash lamp. The reason for this "tail" effect or afterglow is obscure, but it is probably due to radiation during the recombination period. It will also be noted that the peak of the flash pulse lags the peak of the current pulse by approximately one-half microsecond. This lag factor should be compensated for when synchronizing the sweep of the position plan indicator 35 with a reflected echo pulse video signal.

Referring again to FIG. 1, the sensitivity time control circuit network 44 includes a mercury vapor thyratron tube 47 which contains a filament 48, a grid 49 and a plate element 50. Also included in the circuit 44 is a full-wave rectifier 51, and a circuit operation switch 52. The filaments of the tubes 47 and 51 are heated from transformers 53 and 54 which are energized by an alternating-current source 55. When the circuit operation switch 52 is closed, the circuit network 44 is in an operating condition and a voltage obtained from an alternating-current source 56 is applied through a phase shifting network comprising condensers 57, 58, 59, 60, 61 and 62 to a high voltage winding of a power transformer 63.

Consider the operation of the circuit network titled 44 when no synchronizing pulse is received at the transformer 38 from the flash lamp 10. With the control switch 52 in an operate position, a square-wave circuit network comprising condensers 65, 66, 67, 68, 69, 70 and inductances 71, 72, 73, 74, 75 will receive a charge through a resistor 76, from one side of the rectifier 51 on one half-cycle of an alternating-current wave from the source 56. On the alternate half-cycle of the same alternating-current wave the square-wave network units 65 to 75, will receive a charge from the other side of the rectifier 51. These charging effects will continue until a voltage is built up across the square-wave units 65 to 75 which is competent to operate and fire the mercury vapor thyratron tube 47. This firing of the thyratron tube 47 will occur near the peak of the second half-cycle of the full alternating current cycle wave from the source 56, as it appears across the primary of the power transformer 63.

The instant at which the mercury vapor thyratron tube 47 fires is determined not only by the voltage on the square-wave network units 65 to 75, but also by a bias on the grid 49 of the thyratron tube 47. The tube 47 is fired by discharge of condenser 46 upon grid 49, and later there is a bias control on the grid 49 due to a voltage developed across a condenser 77, when the main gap of the tube 47 fires. The square-wave network units 65 to 75 are discharged through inductances 78 and 79, and from the plate 50 to the filament 48 of the thyratron 47. From the filament 48 the discharge path leads through a parallel circuit comprising the condenser 77 and a resistance 80, a potentiometer 81, and a resistor 82. From the potentiometer 81 the output voltage is led via a potentiometer slider arm 83 to the primary winding of a sensitivity time control transformer 84. The voltage is stepped-up by the transformer 84 and appears across the dynodes 20 to 29 of the photomultiplier tube 19. This compensating voltage is in series with and of the same polarity as the direct-current voltage derived from the controllable direct-current supply 31. A fixed circuit network, comprising resistors 85, 86, condenser 87 and the transformer 84, shapes the square-wave voltage from the network 44 so as to produce a rate of change of voltage which may be utilized for signal amplitude equalization versus time in the photomultiplier tube 19. The voltage wave applied across the dynodes 20 to 29 of the photomultiplier 19 gradually increases with time from a fixed minimum value up to a certain predetermined limiting voltage value, and beyond this limiting value there is a fairly sharp decrease as the tube 47 ceases to discharge. The shape of the applied voltage wave is shown and titled 90, and is also shown in FIG. 4. The length of the sensitivity time control square-wave pulses is determined by the time required for discharge of the square-wave network units 65 to 75 through the discharge pathway described above. The peak amplitude of the sensitivity time control square-wave pulse may be controlled by adjustment of the potentiometer slider arm 83. When the slider arm 83 is situated at the top end of the potentiometer 81 a voltage across the resistor 82 is applied to the transformer 84. When the slider arm 83 is situated at the lower end of the potentiometer 81, a potential across the resistor 82 plus a potential across the potentiometer 81 is applied to the transformer 84. A change in the amplitude of a sensitivity time control square-wave pulse also involves a change in the slope of the wave at the photomultiplier 19 since the shaping network, comprising the units 85, 86 and 87, remains fixed in value.

When the potential at the plate 50 of the thyratron tube 47 drops below the sustaining voltage of the tube 47, as when the square-wave network units 65 to 75 become discharged, curent ceases to flow through the thyratron 47 and the sensitivity time control voltage drops to zero. Upon the next complete cycle of the sixty-cycle wave the square-wave network units 65 to 75 become recharged through the resistor 76 from the rectifier 51 and the discharge cycle is ready for re-use.

When no synchronizing pulse from the flash lamp 10 is applied to the sensitivity control circuit network 44, the square wave voltage from the network 44 is in phase with a sixty cycle voltage wave applied to the primary of the transformer 63 from the alternating-current source 56. However, the initiation of the sensitivity time control voltage wave must coincide with the beginning of the range sweep 36 of the plan position indicator 35. At the instant at which the range sweep 36 starts, the elapsed sweep time is zero, and the target range is also zero. At this instant the voltage across the photomultiplier from the time control circuit will be zero voltage. The negative voltage, from the sensitivity time control square-wave network 44 which is applied to elements of the photomultiplier 19, at first increases rapidly with elapsed sweep time, but the rate of change progressively decreases as an approach to a predetermined maximum voltage is attained at the end of each sweep of the plan position indicator 35. This maximum voltage may be adjusted by the slider arm 83 and may be varied from five hundred to fifteen hundred volts. Since the gain of the photomultiplier increases as the applied voltage increases, up to a limiting potential, the weaker echo pulses from the more distant targets will receive more amplification than will the stronger echo signal pulses from nearby targets, thus substantially obtaining an equalization of all echo pulse signals.

Since the start of the square-wave voltage output from the network 44 must coincide with the beginning of the range sweep 36 of the plan position indicator 35, the network 44 should be triggered from the circuit of the flash lamp 10. Accordingly, a synchronizing pulse from the flash lamp 10 is connected to the primary of the transformer 38 via the coaxial cable 39. Since the synchronizing voltage from the flash lamp circuit is of negative polarity, the transformer 38 reverses the synchronizing voltage polarity so that a positive pulse appears on the grid 49 of the thyratron 47 to trigger the thyratron each time the flash lamp fires. The resistance 45 is utilized to terminate the transformer 38, and the condenser 46 is used as a blocking condenser.

Both the flash lamp 10 and the sensitivity time control circuit 44 may be energized if desired from the same alternating-current source. To insure the triggering of the sensitivity time control circuit 44 at the correct instant, the phase of the voltage wave on the primary of the transformer 63 is retarded approximately ninety degrees by the resistance capacitance network which is inserted between the source 56 and the transformer 63. The phase angle of this voltage wave may be adjusted by means of variable resistors 88 and 89, so that the thyratron 47 is triggered by a positive synchronized pulse on the grid 49 just before tube 47 would have fired from the voltage on the square-wave network units 65 to 75 if there had been no synchronizing pulse. Once the thyratron 47 is ignited the discharge and subsequent recharging of the square-wave network units 65 to 75 take place as previously described, and on the next flash of the flash lamp 10 the thyratron 47 is again triggered and the sensitivity time control cycle repeated.

The varying equalizing voltage supplied to the photomultiplier 19 from the network 44 is in series with and of the same polarity as the direct-current supply utilized to bias the cathode and dynodes of the photomultiplier 19. The value of the negative biasing current, supplied to the photomultiplier from the direct-current source 31, may be manually adjusted by a rheostat 64 from a value of zero volts to two thousand volts. This direct-current voltage supply from the source 31 can be applied to the photomultiplier 19 alone, or in combination with the equalizing voltage from the network 44. Since the voltages from the network 44 and the source 31 may be varied independently by the controls 64 and 83, the correct adjustment of each voltage will cause targets, situated at minimum to maximum ranges, to appear as bright spots of equal intensity on the screen of the plan position indicator 35.

Any suitable plan position indicator may be utilized with the invention, such as the CAY–55ADV–VI Navy type plan position indicator. Other suitable indicators are disclosed in Patent 2,421,747 issued June 10, 1947 to G. B. Engelhardt, and in the pending application of N. W. Bryant, Serial No. 423,757 filed December 20, 1941, now Patent No. 2,471,516, dated May 31, 1949.

An advantage obtained by the invention over most radar systems resides in the ability to accurately measure ranges down to collision distances. This is made possible by the relative weakness of local reflection signals compared to signals from a reflector target, and also on account of the fact that no time interval is necessary to switch from the state of transmission to that of reception.

It is to be understood that the above described embodiments are illustrative examples and that various modifications may be made without departing from the spirit of the invention.

What is claimed is:

1. In combination, means for producing and directing towards a target electromagnetic pulses falling within the range of the infra-red wavelength band, wave reception means for receiving echo pulse reflections from said target, wave sensitive electrical means upon which said echo pulses are directed by said reception means for producing an electromotive pulse output from said sensitive means in accordance with said received echo pulses, regulating means connected to said sensitive means for varying with time the voltage across said sensitive means, the rate of change of said voltage increasing with time up to a certain predetermined time instant and progressively decreasing as an approach to a predetermined maximum voltage level is attained.

2. In combination, means for producing and directing towards a target electromagnetic pulses falling within the range of the infra-red, visible and ultra-violet wavelength bands, means for receiving echo pulses from said target, wave sensitive means upon which said echo pulses are directed by said reception means, means for transforming the received pulses into corresponding electric pulses, means for applying a voltage across said wave sensitive electric means, means for varying with time said voltage so that the amplitudes of said electric pulses are substantially equal, and a cathode-ray oscilloscope system to which said electric pulses are applied.

3. In combination, means for producing and directing towards a target electromagnetic pulses falling within the range of the visible, ultra-violet and infra-red wavelength bands, wave reception means for receiving echo pulses from said target, wave sensitive electric means upon which said echo pulses are focussed by said receiving means, circuit means connected to said sensitive means for transforming said focussed pulses into electrical pulses of similar characteristics, means for utilizing said electrical pulses to produce an indication of the distance and existence of said target, said means for producing the electromagnetic pulses comprising a discharge producing flash-lamp, said wave sensitive means comprising a photoelectron multiplier having a cathode and a plurality of electrodes, and means for applying a variable voltage between said cathode and said electrodes, said varying means comprising a sensitivity time control circuit including a square-wave producing network and a shaping network for utilizing the square-wave voltage in such manner that said variable voltage changes with time.

4. In a thermal-energy system for measuring the range of objects in relation to said system the combination of, means for producing thermal-energy pulses, said means comprising a discharge producing flash-lamp, means for applying a high voltage to said flash-lamp to cause it to discharge, means for directing flash pulses originated by said discharge towards said objects, means for collecting reflected pulses from said objects, means for translating said collected reflected pulses into electric pulses, said translating means comprising a photoelectron multiplier having a cathode and a plurality of electrodes, means for applying a variable direct-current control voltage to said multiplier between said cathode and electrodes, means for producing a synchronizing pulse during each discharge of said flash-lamp for controlling the application of said variable direct-current control voltage.

5. In a thermal-energy system for scanning an area obtain the range of objects situated within said area the combination of, means for producing and directing towards said objects electromagnetic thermal-energy pulses falling within the range of the infra-red, visible and ultra-violet wavelength bands, means for receiving energy pulses reflected back from said objects, said receiving means comprising apparatus for receiving said reflected pulses with a reflector and focussing them upon a photoelectron multiplier, means for applying an operating voltage to said multiplier, said operating voltage comprising an adjustably controllable direct current, additional means for controlling the gain of said multiplier, said additional control means comprising a sensitivity time control square-wave producing circuit connected to said multiplier, the voltage output of said circuit in phase with and of the same polarity as said operating voltage, and means for varying the shape of the square wave so that said multiplier gain is progressively increased with time until a preselected maximum voltage value is attained.

6. In an infra-red system for detecting thermal-energy pulses emanating from thermal-energy sources, said pulses having various peak amplitudes, comprising, means for collecting said pulses, means for transforming said pulses into equivalent electrical pulses, means for applying a varying equalizing voltage to said electrical pulses, means for initially increasing said applied voltage rapidly with time, and means for subsequently increasing said voltage at a reduced rate as a predetermined maximum voltage is approached.

7. In an infra-red system for directing energy pulses emanating from thermal-energy sources, said pulses having various peak amplitudes, a pulse equalization system comprising, means for collecting said pulses, means for focussing said pulses upon a sensitive element in a photoelectron multiplier, means for impressing an operating voltage upon said multiplier, means for impressing a sensitivity time control voltage upon said operating voltage so as to progressively increase the amplification gain of said multiplier up to a limiting voltage value corresponding to a predetermined elapsed time.

References Cited in the file of this patent

UNITED STATES PATENTS

| | | |
|---|---|---|
| 2,009,459 | Turner | July 30, 1935 |
| 2,167,492 | Sproule | July 25, 1939 |
| 2,361,648 | Petty | Oct. 31, 1944 |
| 2,435,960 | Fyler | Feb. 17, 1948 |

OTHER REFERENCES

RCA Review for September 1946, vol. VII, No. 3, pages 358–366.

RCA Review for September 1946, vol. VII, No. 3, pages 385–413.

Popular Science for October 1947, pages 146 and 147.